(12) United States Patent
De Groot et al.

(10) Patent No.: US 7,012,700 B2
(45) Date of Patent: Mar. 14, 2006

(54) INTERFEROMETRIC OPTICAL SYSTEMS HAVING SIMULTANEOUSLY SCANNED OPTICAL PATH LENGTH AND FOCUS

(75) Inventors: Peter J. De Groot, Middletown, CT (US); Xavier Colonna De Lega, Middletown, CT (US); Senthil Balasubramaniam, Rocky Hill, CT (US)

(73) Assignee: Zygo Corporation, Middlefield, CT (US)

( * ) Notice: Subject to any disclaimer, the term of this patent is extended or adjusted under 35 U.S.C. 154(b) by 111 days.

(21) Appl. No.: 10/464,723

(22) Filed: Jun. 17, 2003

(65) Prior Publication Data

US 2004/0027576 A1 Feb. 12, 2004

Related U.S. Application Data

(60) Provisional application No. 60/389,762, filed on Jun. 17, 2002.

(51) Int. Cl.
G01B 9/02 (2006.01)
(52) U.S. Cl. .................................. 356/512
(58) Field of Classification Search ............ 356/513, 356/512, 511, 515
See application file for complete search history.

(56) References Cited

U.S. PATENT DOCUMENTS

| 4,340,306 A | 7/1982 | Balasubramanian ........ 356/360 |
| 4,872,755 A | 10/1989 | Küchel ........................ 356/360 |
| 5,204,734 A | 4/1993 | Cohen et al. ................ 356/359 |
| 5,398,113 A | 3/1995 | de Groot ..................... 356/360 |
| 5,784,164 A | 7/1998 | Deck et al. .................. 356/359 |
| 5,956,141 A | 9/1999 | Hayashi ....................... 356/357 |
| 5,991,035 A | 11/1999 | Bruning ....................... 356/359 |
| 6,144,449 A | 11/2000 | Knuettel et al. ............. 356/345 |
| 6,154,279 A | 11/2000 | Thayer ......................... 356/376 |
| 6,195,168 B1 | 2/2001 | De Lega et al. ............. 356/497 |
| 6,714,307 B1 * | 3/2004 | De Groot et al. ........... 356/512 |
| 2003/0043385 A1 * | 3/2003 | Kuchel ......................... 356/513 |
| 2003/0048454 A1 * | 3/2003 | Prinzhausen et al. ....... 356/497 |
| 2004/0239947 A1 * | 12/2004 | De Groot et al. ........... 356/512 |

FOREIGN PATENT DOCUMENTS

| CA | 2 412 737 | 12/2002 |
| DE | 100 33 189 C1 | 9/2001 |
| WO | WO 01/27558 | 4/2001 |
| WO | WO 01/75395 | 10/2001 |
| WO | WO 02/14845 | 2/2002 |

OTHER PUBLICATIONS

Boppart et al., "Forward-imaging instruments for optical coherence tomography", *Optics Letters*, vol. 22, No. 21, pp. 1618-1620 (Nov. 1, 1997).

Blümel et al., "Absolute interferometric calibration of toric and conical surfaces", *SPIE*, vol. 3134, pp. 370-378 (Jul. 1997).

(Continued)

Primary Examiner—Hwa (Andrew) Lee
(74) Attorney, Agent, or Firm—Fish & Richardson P.C.

(57) ABSTRACT

In certain aspects, the invention features scanning interferometry systems and methods that can scan an optical measurement surface over distances greater than a depth of focus of imaging optics in the interferometry system, while keeping an optical measurement surface in focus (i.e., maintaining an image of the optical measurement surface coincident with the detector). The optical measurement surface refers to a theoretical test surface in the path of test light in the interferometer that would reflect the test light to produce an optical path length difference (OPD) between it and reference light that is equal to a constant across a detector.

49 Claims, 10 Drawing Sheets

OTHER PUBLICATIONS

Brinkman et al., "Testing of rod objects by grazing-inidence interferometry: experiment", *Applied Optics*, vol. 38, No. 1, pp. 121-125 (Jan. 1, 1999).

Chakmakjian et al., "Simultaneous focus and coherence scanning in interference microscopy", *Technical Digest, International Workshop on Interferometry*, 171 (Riken, Japan, 1996).

Dresel et al., "Three-dimensional sensing of rough surfaces by coherence radar", *Applied Optics*, vol. 31, No. 7, pp. 919-925 (Mar. 1, 1992).

Li et al., "Imaging needle for optical coherence tomography", *Optics Letters*, vol. 25, No. 20, pp. 1520-1522 (Oct. 15, 2000).

Lindner et al., "White-light interferometry via an endoscope", *SPIE*, vol. 4777, pp. 90-101 (Jul. 2002).

Matthys et al., "Panoramic Holointerferometry", *Experimental Mechanics*, vol. 35, No. 1, pp. 83-88 (Mar. 1995).

Schwider, "White-light Fizeau interferometer", *Applied Optics*, vol. 36, No. 7, pp. 1433-1437 (Mar. 1, 1997).

Zhou et al., "Surface profile measurements using a white light Linnik interferometer", *Annual Report Lehrstuhl für Optik, Univ. Elrlangen-Nürnberg*, pp. 69 (1996).

* cited by examiner

INTERFEROMETRIC OPTICAL SYSTEMS HAVING SIMULTANEOUSLY SCANNED OPTICAL PATH LENGTH AND FOCUS

CROSS-REFERENCE TO RELATED APPLICATIONS

This claims priority to Provisional Patent Application 60/389,762, entitled "INTERFEROMETRIC OPTICAL SYSTEMS HAVING SIMULTANEOUSLY SCANNED OPTICAL PATH LENGTH AND FOCUS," filed on Jun. 17, 2002, the entire contents of which is hereby incorporated by reference.

TECHNICAL FIELD

This invention relates to optical metrology.

BACKGROUND

Instruments for profiling surfaces are generally classified as either contact or noncontact types. With contact types, a stylus is used to mechanically move over the surface while in physical contact with it to build up information about surface features including their position and scale. Noncontact types are usually optically based and may be either scanning types or full-field types depending on whether or not a probe is moved over a surface in the manner of a stylus but not in contact with the surface or an area larger than that measured by a probe is imaged all at once.

Optical metrology of surface profiles can generally be divided into two regimes, namely interferometric and geometric. Geometric techniques include triangulation and moire fringe analysis, which involves the projection and imaging of a periodic structure such as a Ronchi ruling. Geometric techniques are relatively insensitive to surface roughness and deformations, but are of relatively low resolution thus making them unsuitable for many applications in which surface profiles must be measured with high precision.

Interferometry, on the other hand, relies on the wave nature of light for high precision measurement of the surface profile of a test object. A typical interferometer includes a light generator that produces a beam of light followed by a beam divider that splits the beam into reference and measurement beams. The reference beam is then reflected off a reference surface, and the measurement beam off the object whose surface is to be profiled. First and second reflected wavefronts from the reference and measurement surfaces are then recombined with one another while interfering both constructively and destructively to produce an interference fringe pattern at a detector, the fringe pattern being a function of the optical path difference between the paths traveled by the reference and measurement beams. The optical path difference results in differences in phase as a result of the differences in optical path traveled between the reference and measurement beams. An imaging device, such as a solid state camera, receives the recombined wavefronts and acquires images of the interference fringe pattern. The interference fringe pattern then is analyzed to obtain information about the surface profile of the test object.

Fringe pattern analysis for surface profilometry often is performed by the well-known technique of phase shifting interferometry (PSI). In PSI, the height difference between locations on a surface imaged by first and second pixels on the imaging device is determined by first determining a phase difference between light received at the first and second pixels and by then using the phase difference to calculate a height difference. A primary advantage of PSI is that it is highly precise. The vertical height precision for PSI is a fraction (e.g., $1/100$) of the optical wavelength of the light source used to conduct the measurement. A second advantage of PSI is that it has good vibration immunity characteristics because phase data is acquired for all pixels simultaneously and because the data acquisition time is relatively short.

Generally speaking, however, conventional PSI approaches can profile only smooth surfaces having relatively small height variations or "surface departures" between adjacent measurement sites (the maximum height deviation that can be accommodated is +/− one quarter wavelength) since conventional interferometry on a surface with high slopes generates such a high fringe density that no meaningful information can be derived from the fringe pattern. Therefore, while PSI interferometry is much more precise than geometric optical profilometry, it historically has been considered to be ill-suited for use with rough objects or objects having marked surface deformations.

One interferometric technique that lacks the quarter-wavelength constraint of PSI is the so-called scanning white light interferometry or SWLI. In SWLI, a white light illumination source or, more generally, one which is of a broad-band spectrum as opposed to being of a narrow-band spectrum (e.g., a laser), generates an interference pattern which contains, as a function of scan position, regions of high contrast for each location on the test surface. The scan position of high contrast for a given pixel indicates the height of the corresponding location on the test surface. Therefore, by comparing the temporal characteristics of these regions of high contrast with one another, a difference in height between two locations on the profiled surface can be determined. Unlike PSI, SWLI does not calculate height differences based on phase differences, and the PSI phase constraint therefore does not apply to SWLI. The maximum physical departure between adjacent measurement sites on a profiled surface therefore may be much larger with SWLI than with PSI.

In some embodiments, SWLI can be refined using phase measurement techniques to provide the same resolution as PSI while being able to measure discontinuous surfaces.

Examples of manufactured items requiring metrology include engine parts, components for magnetic storage devices, flat-panel displays, molded and textured plastic surfaces, mechanical pump surfaces and seals, and minted coins. In these and other Industrial Markets, there is a significant and growing need for fast, accurate metrology of parts having non-flat prismatic surfaces.

SUMMARY

In certain aspects, the invention features scanning interferometry systems and methods that can scan an optical measurement surface over distances greater than a depth of focus of imaging optics in the interferometry system, while keeping the optical measurement surface in focus (i.e., maintaining an image of the optical measurement surface coincident with the detector). The optical measurement surface refers to a theoretical test surface in the path of test light in the interferometer that would reflect the test light to produce an optical path length difference (OPD) between the test and reference light that is equal to a constant across a detector. For low-coherence light sources (e.g., a broadband source), the constant OPD is typically a zero OPD. In some embodiments, the system maintains the image of the optical measurement surface in focus by moving the location of the detector. Alternatively, or additionally, one or more of the imaging optics can be scanned to vary the position of the image of the optical measurement surface nearest the detector. The optical measurement surface is typically scanned by moving optics in the reference leg of the interferometer to vary the optical path length of the reference light at the detector.

The focus adjustment can be arranged so as to preserve either constant object magnification or constant field angle mapping at the object throughout the optical path difference scan. The speed for the focus and OPD scans can have any ratio or functional relationship, programmable via computer control, facilitating systems for which the focus scan rate is different than that of the OPD scan rate, because, e.g., of non 1:1 imaging.

Embodiments include a Linnik interferometer for flat surface imaging, using telecentric optics, an OPD scanner on the interferometer's reference arm and a focus scan involving displacing an electronic imaging device such as a CCD camera. In this case, the scan can be achieved with constant magnification between the object and the image. A further benefit of this arrangement is a continuously variable working distance from the optical system to the part surface while maintaining constant magnification.

An alternative embodiment is an interferometer for measuring non-flat surfaces, particularly spheres and cones, using non-telecentric optics. In this case, the scanning is arranged to provide constant field angle at the object while the magnification varies continuously during the scan. Here again, the object surface remains in sharp focus throughout the scan by virtue of an independent focus and OPD scan.

In general, in one aspect, the invention features a method including: imaging test light reflected from a test surface to interfere with reference light on a camera and form an interference pattern, the test light and reference light being derived from a common source, wherein optical paths for the test and reference light define an optical measurement surface corresponding to a theoretical test surface that would reflect the test light to produce a constant optical path length difference (e.g., a zero optical path length difference) between it and the reference light over the camera; scanning the optical measurement surface relative to the test surface; and adjusting a position of the camera relative to an image of the optical measurement surface nearest the camera during the scan of the optical measurement surface.

Embodiments of the method may include any of the following features

The position of the camera relative to the image of the optical measurement surface may be adjusted during the scan of the optical measurement surface to maintain the optical measurement surface within a depth of focus of an imaging system used to image the test light to the camera.

Adjusting the position of the camera relative to the image of the optical measurement surface may include moving the camera.

Adjusting the position of the camera relative to the image of the optical measurement surface may include moving at least one component used to image the test light to the camera. For example, adjusting the position of the camera relative to the image of the optical measurement surface may include moving a telescopic relay used to image the test light to the camera, wherein the telescopic relay has a magnification unequal to 1.

The method may further include recording images of the interference pattern with the camera as a function of the optical measurement surface scan.

Scanning the optical measurement surface relative to the test surface may include scanning a radius of curvature of a locally spherical portion of the optical measurement surface. For example, the radius of curvature may be varied relative to a measurement datum point. Also, the imaging may include focusing the test light towards a measurement datum point. For example, the measurement datum point may be positioned prior to the test surface.

The reference light may reflect from a reference surface prior to reaching the camera, and wherein scanning the optical measurement surface relative to the test surface includes moving at least the reference surface. The reference light may be focused towards a reference focal point prior to reflecting from the reference surface. For example, the reference focal point may be positioned prior to the reference surface. Also, the reference light may reflect from a curved portion of the reference surface. For example, the reference surface may reflect the reference light back to the reference focal point.

Furthermore, scanning the optical measurement surface relative to the test surface may include scanning a location of the reference focal point.

Also, the reference light may reflect from a planar portion of the reference surface.

The common source may have a coherence length and the optical measurement surface may be scanned over a range larger than the coherence length.

The common source may have a coherence length and the optical measurement surface may be scanned over a range smaller than the coherence length The test light and the reference light may be derived from the common source using an interferometer. For example, the interferometer may be a Linnik interferometer or a Mirau interferometer. Also, the method may further include adjusting the location of the test surface relative to the interferometer.

In general, in another aspect, the invention features an apparatus including: an interferometric imaging system configured to image test light reflected from a test surface to interfere with reference light on a camera and form an interference pattern, the test light and reference light being derived from a common source, wherein optical paths for the test and reference light define an optical measurement surface corresponding to a theoretical test surface that would reflect the test light to produce a constant optical path length difference (e.g., a zero optical path length difference) between it and the reference light over the camera; wherein the interferometric imaging system includes a first stage configured to scan the optical measurement surface relative to the test surface, and a second stage configured to adjust a position of the camera relative to an image of the optical measurement surface nearest the camera during the scan of the optical measurement surface.

Embodiments of the apparatus may include any of the following embodiments.

The apparatus may further include an electronic controller in communication with the first stage and second stage, and during operation the electronic controller may cause the first stage to scan the optical measurement surface relative to the test surface and cause the second stage to adjust the position of the camera relative to the image of the optical measurement surface nearest the camera to maintain the optical measurement surface within a depth of focus of the interferometric imaging system.

The camera may be mounted on the second stage and during operation the electronic controller may cause the second stage to adjust the position of the camera relative to the test surface to maintain the optical measurement surface within a depth of focus of the interferometric imaging system.

The interferometric imaging system may further include at least one imaging component mounted on the second stage, and during operation the electronic controller may cause the second stage to adjust the position of the imaging component relative to the test surface to maintain the optical measurement surface within a depth of focus of the interferometric imaging system. For example, the at least one imaging component may be a telescopic relay mounted on the second stage, and during operation the electronic controller may cause the second stage to adjust the position of the telescopic relay relative to the test surface to maintain the optical measurement surface within a depth of focus of the interferometric imaging system. The telescopic relay may have a magnification unequal to 1.

The electronic controller may also be in communication with the camera, and during operation the electronic controller may record images of the interference pattern with the camera as a function of the optical measurement surface scan.

The interferometric imaging system may further include measurement optics, which direct test light to and from the test surface, and reference optics, which direct reference light to and from a reference surface. For example, the reference optics may be identical to the test optics.

The reference surface may be mounted on the first stage, and during operation the first stage may scan the optical measurement surface relative to the test surface by translating the reference surface. Furthermore, the reference optics may also be mounted on the first stage, and during operation the first stage may scan the optical measurement surface relative to the test surface by translating the reference optics and the reference surface. For example, the reference surface may be a planar surface or a curved surface (e.g., a spherical surface).

The reference optics may include a reference lens that focuses the reference light towards a reference focal point.

The measurement optics may include an objective lens, which focuses the measurement light toward a measurement datum point.

The optical measurement surface may include a planar surface.

The optical measurement surface may include a locally spherical surface.

The source may be a broadband source.

The interferometric imaging system may include a Linnik interferometer, which derives the test light and reference light from the common source.

The interferometric imaging system may include a Mirau interferometer, which derives the test light and reference light from the common source.

The apparatus may further include a third stage configured to adjust a position of the test surface relative to the interferometric imaging system.

Embodiments of the invention can have one or more of the following advantages.

Maintaining the optical measurement surface in focus while scanning over large ranges can provide ease of use for profiling surfaces having large surface profile variations. In particular, it can allow one to scan over an entire test surface without having to adjust the location of the test part relative to the interferometer. Alternatively, or additionally, systems that include objective lenses having a large numerical aperture, and hence small depth of focus, can be used for profiling surfaces having large surface profile variations.

In some embodiments, the test part does not move with respect to the interferometer. This can make part fixturing easier since the fixture can attach directly to the interferometer housing. This can also reduce sensitivity to vibration through stronger and more direct mechanical coupling of the part to the interferometer.

As used herein, the temporal coherence length of a source point for a band-limited spectrum of width $D_1$ (full-width at half maximum) and centered at a mean wavelength $\lambda_0$ is $\lambda_0^2/D_1$.

As used herein, the spatial coherence of an extended monochromatic or quasi-monochromatic source is: $4\lambda/NA^2$, for an interferometer where the source fills the pupil of a collimating objective of numerical aperture NA. A filled pupil means that if F is the focal length of the microscope objective then the source size at the pupil is at least 2 F NA. If the source is smaller than the pupil then the spatial coherence of an extended monochromatic or quasi-monochromatic source is: $16\lambda F^2/D^2$ where D is the source diameter.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
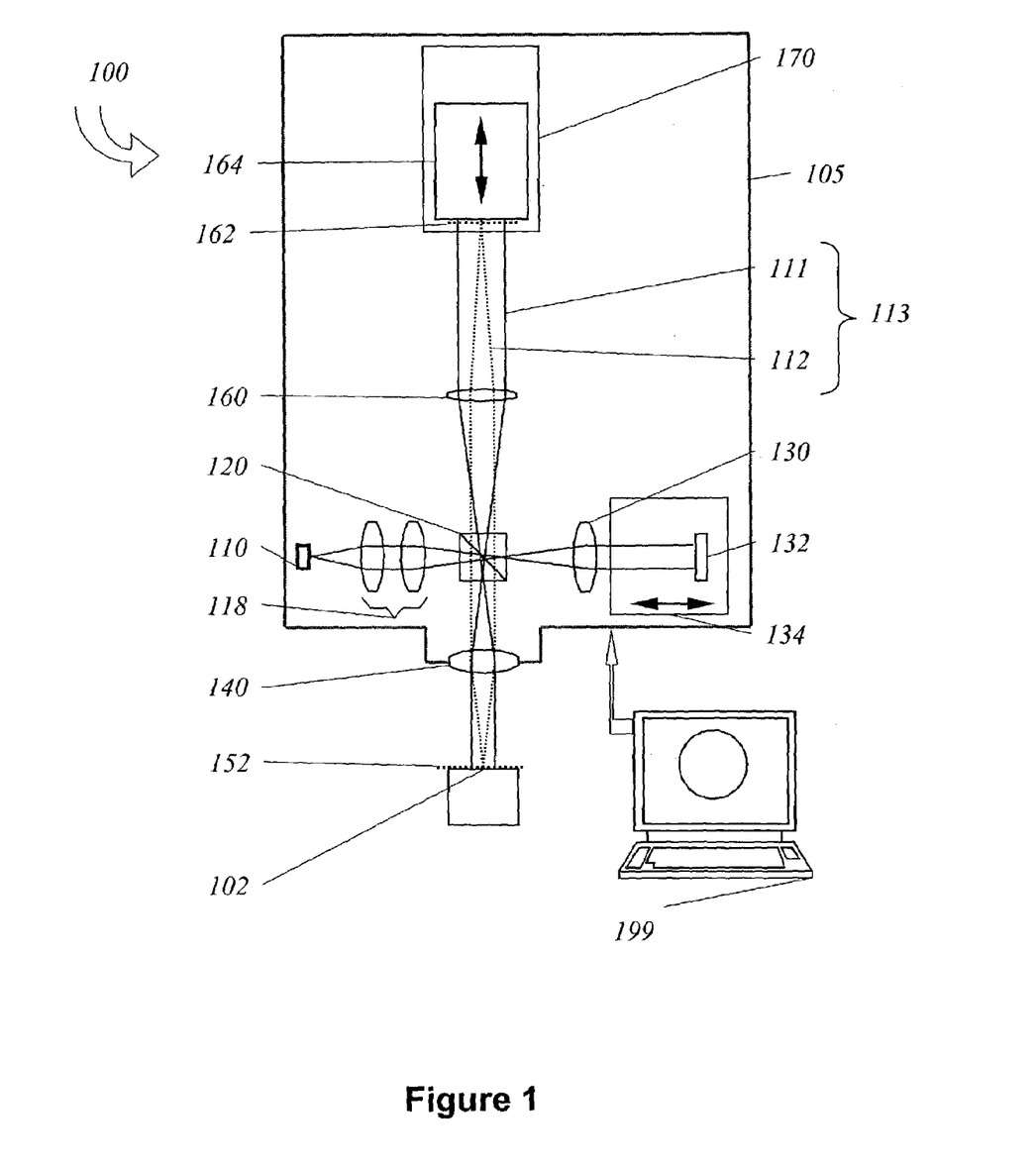
FIG. 1 is a schematic view of an embodiment of an interferometry system.

Referring to FIG. 1, an interferometry system configured for measuring nominally flat surfaces includes a sensor 100 housed in an enclosure 105. Sensor 100 is similar to a Linnik interferometer, in which a set of reference optics, in this case a reference lens 130, essentially duplicate a set of measurement optics, here measurement lens 140, to match chromatic dispersion and optical aberrations. During operation, sensor 100 interferometrically measures a surface profile of a test surface 102 of a test part, positioned remote from the sensor.

Sensor 100 includes a light source 110, a camera 164, and numerous optical components (described below). Light source 110, e.g., a low-coherence source such as a halogen bulb, a light emitting diode (LED), or a super-luminescent diode (SLD), directs light to a beam splitter 120 via illuminator optics 118. Beam splitter 120 splits the light into a measurement beam and a reference beam. The reference beam illuminates a reference mirror 132 via reference lens 130, while the measurement beam illuminates test surface 102 via measurement lens 140. Reference mirror 132 is mounted on an OPD scan stage 134, which scans reference mirror 132 relative to reference lens 130. Reference lens 130 and measurement lens 140 both have a focal length f. The reference and measurement beams reflect from reference mirror 132 and test surface 102, respectively, and recombine at beam splitter 120 propagating as an output beam 113 towards camera 164. Output beam 113 is represented by chief ray 111 and marginal ray 112 in FIG. 1. The different paths traveled by the reference and measurement beams introduce an optical path difference (OPD) between the reference beam and measurement beam components of output beam 113. This OPD typically varies across the profile of output beam 113 due to variations in the profile of test surface 102. When the OPD is within the temporal coherence length of light source 110, the intensity of the output beam detected by camera 164 varies as a function of the OPD due to interference between the reference and measurement components of output beam 113. In embodiments where light source 110 is a low-coherence source, these interference effects typically occur where the OPD is close to zero (e.g., where the OPD is within a few wavelengths of zero, where the wavelength is that of light source 110). A theoretical surface corresponding to a surface that would reflect the measurement beam to produce a constant optical path length difference between it and the reference beam over the camera is indicated as an optical measurement surface 152, which is located at the focal plane of measurement lens 140 in the present configuration.

Sensor 100 also includes an imaging lens 160, having a focal length 2f and located 3f away from measurement lens 140, which images optical measurement surface 152 to a flat-field image 162. In the present configuration, part surface 102 is located at the focal plane of measurement lens 140, coincident with optical measurement surface 152. Furthermore, camera 164 is located at the focal plane of imaging lens 160. Accordingly, both part surface 102 and optical measurement surface 152 are perfectly in focus at camera 164, with 2× magnification. Note that although the description refers to an image of the optical measurement surface, here image 162, no image is actually formed unless there is a surface coincident with the optical measurement surface to reflect light back into the imaging optics. Just as the optical measurement surface is a theoretical surface, so too is the image of the optical measurement surface. Both are abstract constructs intended to aid in the description of the interferometry systems disclosed herein.

Figure 2:
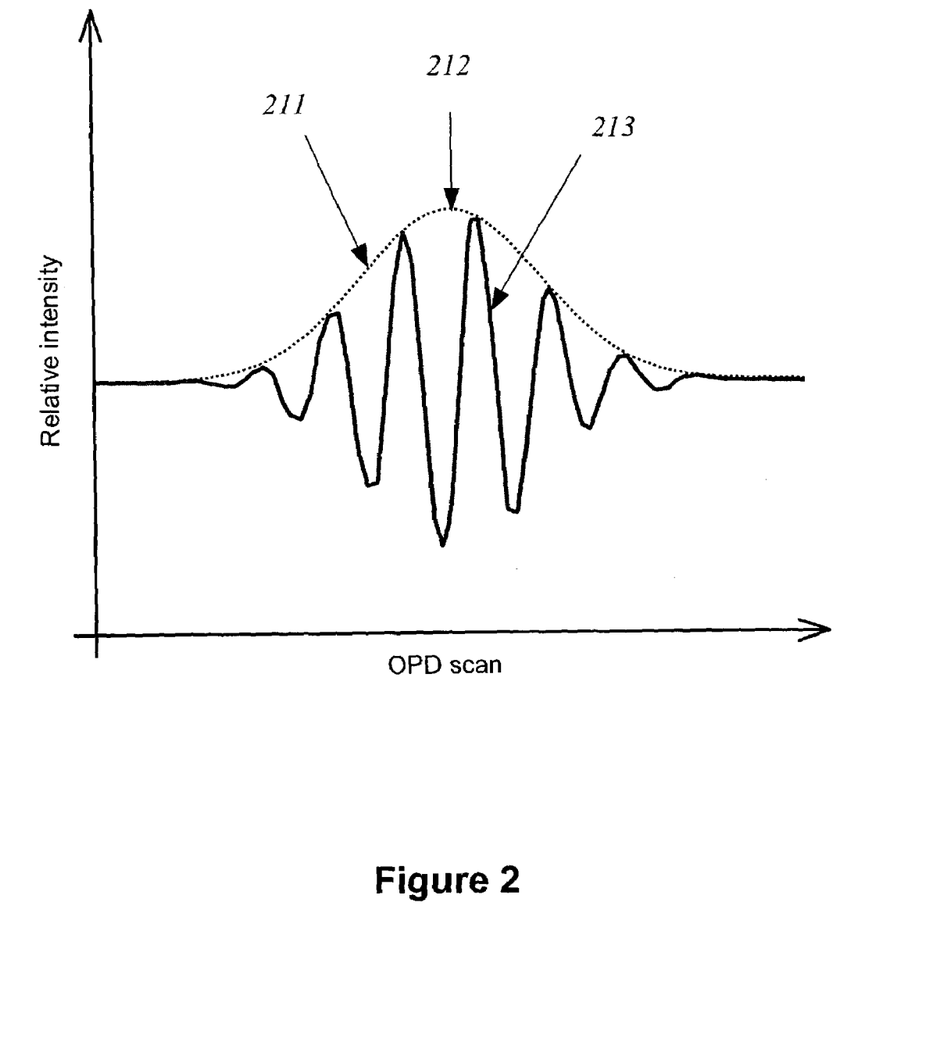
FIG. 2 is a plot of relative intensity versus optical path difference for a single camera pixel using a low coherence source.

In order to measure the profile of part surface 102, OPD scan stage 134 translates reference mirror 132 relative to reference lens 130, thereby scanning the location of optical measurement surface 152 relative to a location on an optical axis of the imaging optics (i.e., measurement lens 140 and imaging lens 160). During the scanning, sensor 100 is under a computer data acquisition and control 199 that accepts electronic intensity data from camera 164. In one approach to determining the profile of part surface 102, the measurement process is similar to that of a scanning white light interferometer. An example data set for a single camera pixel is shown in FIG. 2, which shows the relative intensity of the output beam detected at one pixel as a function of the position of reference mirror 132. The localization of the interference intensity signal 213 around the zero OPD position is characteristic of interferometry assuming that source 110 shown in FIG. 1 is spectrally broadband, e.g., a spectral bandwidth of 100 nm centered at, e.g., 600 nm. The fringe localization provides a means of determining the precise moment when the measurement plane intersects the object point corresponding to the image pixel. The scan motion is precisely controlled by sensor 100, so that knowledge of when a given object point is at zero OPD can be directly translated into a relative length, e.g., of chief ray 111 shown in FIG. 1.

One may apply any of a variety of techniques for determining surface height using low-coherence sources. Suppose, for example, interference data for a first pixel looks as in FIG. 2, with a peak 212 in the fringe contrast 211 at a scan position of 0 $\mu$m. A second pixel for camera 164 might have a different fringe contrast peak at a different scan position, for example, 10 $\mu$m. The difference in position of the contrast peaks between the two object points corresponding to these image pixels would therefore be 10 $\mu$m. For such embodiments, data processing can include, e.g., coherence envelope detection or frequency domain analysis. Coherence envelope detection is described, for example, by T. Dresel and coworkers in "Three-dimensional sensing of rough surfaces by coherence radar," Applied Optics 31(7), pp. 919–925 (1992). Embodiments of frequency domain analysis are described in U.S. Pat. No. 5,398,113, entitled "METHOD AND APPARATUS FOR SURFACE TOPOGRAPHY MEASUREMENT BY SPATIAL-FREQUENCY ANALYSIS OF INTERFEROGRAMS," by P. de Groot. The entire contents of both of these references are hereby incorporated by reference.

Figure 3:
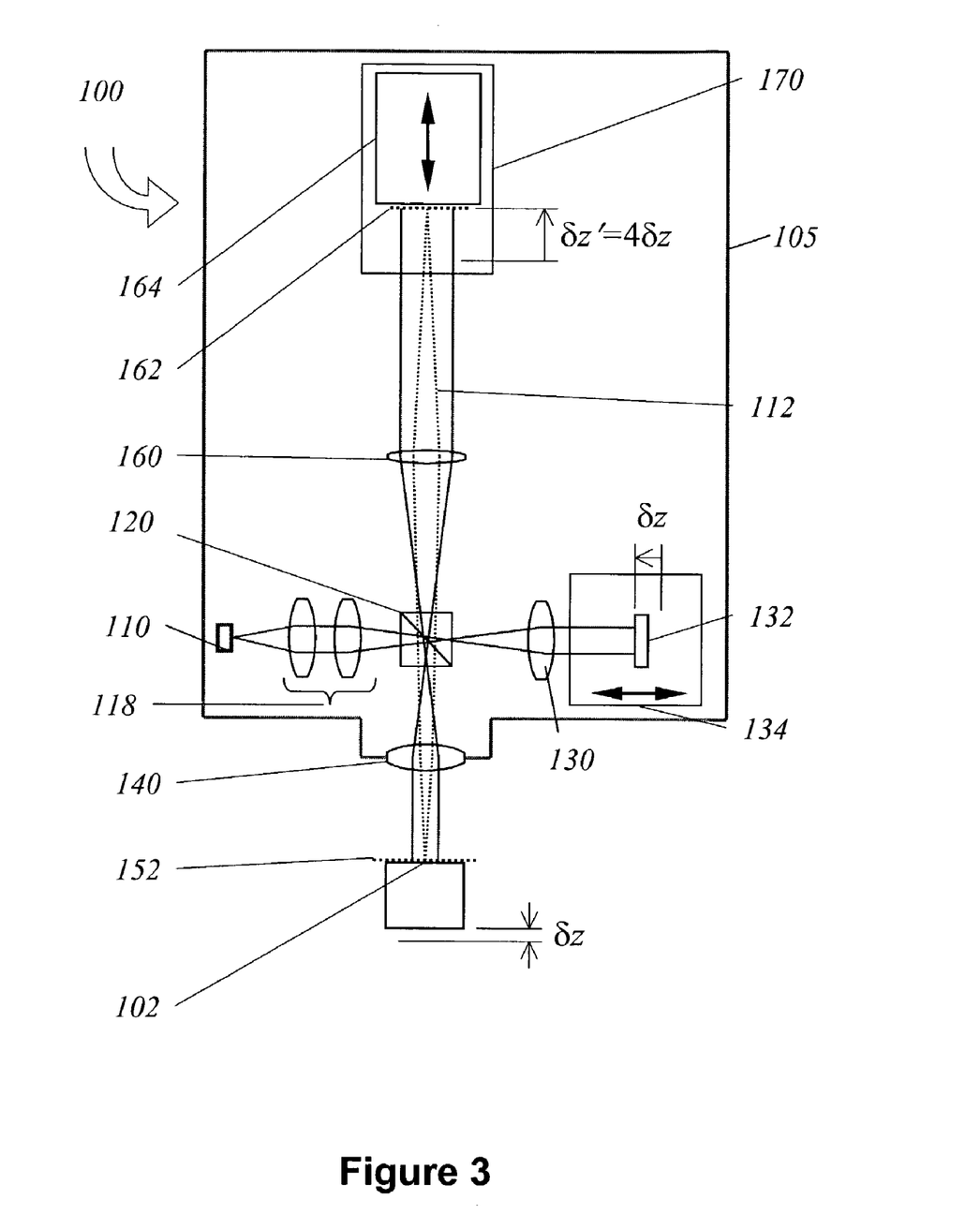
FIG. 3 is a schematic view of the interferometry system of FIG. 1 in a different configuration.

Referring again to FIG. 1, during the scanning, the position of image 162 of optical measurement surface 152 moves as optical measurement surface 152 itself moves. In fact, because of the 2× magnification of the image, the rate at which the image moves is 4× the rate at which optical measurement surface 152 moves. Generally, for sensors in which the optical measurement surface is flat, the relative focus to OPD scan rates are proportional to the square of the magnification of the imaging system. A consequence of the motion of optical measurement surface 152 is that the optical measurement surface is no longer in focus at camera 164 in the present configuration. Referring also to FIG. 3, in order to retain optical measurement surface 152 in focus during the scanning, a focus scan stage 170 scans the location of camera 164. Specifically, in the configuration shown in FIG. 3, the portion of test surface 102 in focus is displaced by an amount $\delta z$ compared to the portion of test surface 102 in focus for the configuration shown in FIG. 1. Accordingly, reference mirror 132 is displaced by $\delta z$ to ensure that optical measurement surface 152 contacts the appropriate portion of test surface 102. Camera 164 is displaced by an amount $\delta z'=4\delta z$ to ensure that optical measurement surface 152 stays in focus and the magnification does not change. Accordingly, in this case, sensor 100 scans camera 164 at a rate that is nominally 4× the rate at which it scans reference mirror 132 (and the optical measurement surface). Thus, image 162 of optical measurement surface 152 remains sharply in focus throughout the OPD scan, while retaining constant magnification. The ratio between the rates of displacement of focus scan stage 170 and OPD scan stage 134 is programmable and controlled by computer 199.

Due to the dual scan, optical measurement surface 152 can be scanned over a very large range (compared to, e.g., the temporal coherence length of light source 110) without changing magnification and without losing image focus.

Figure 4:
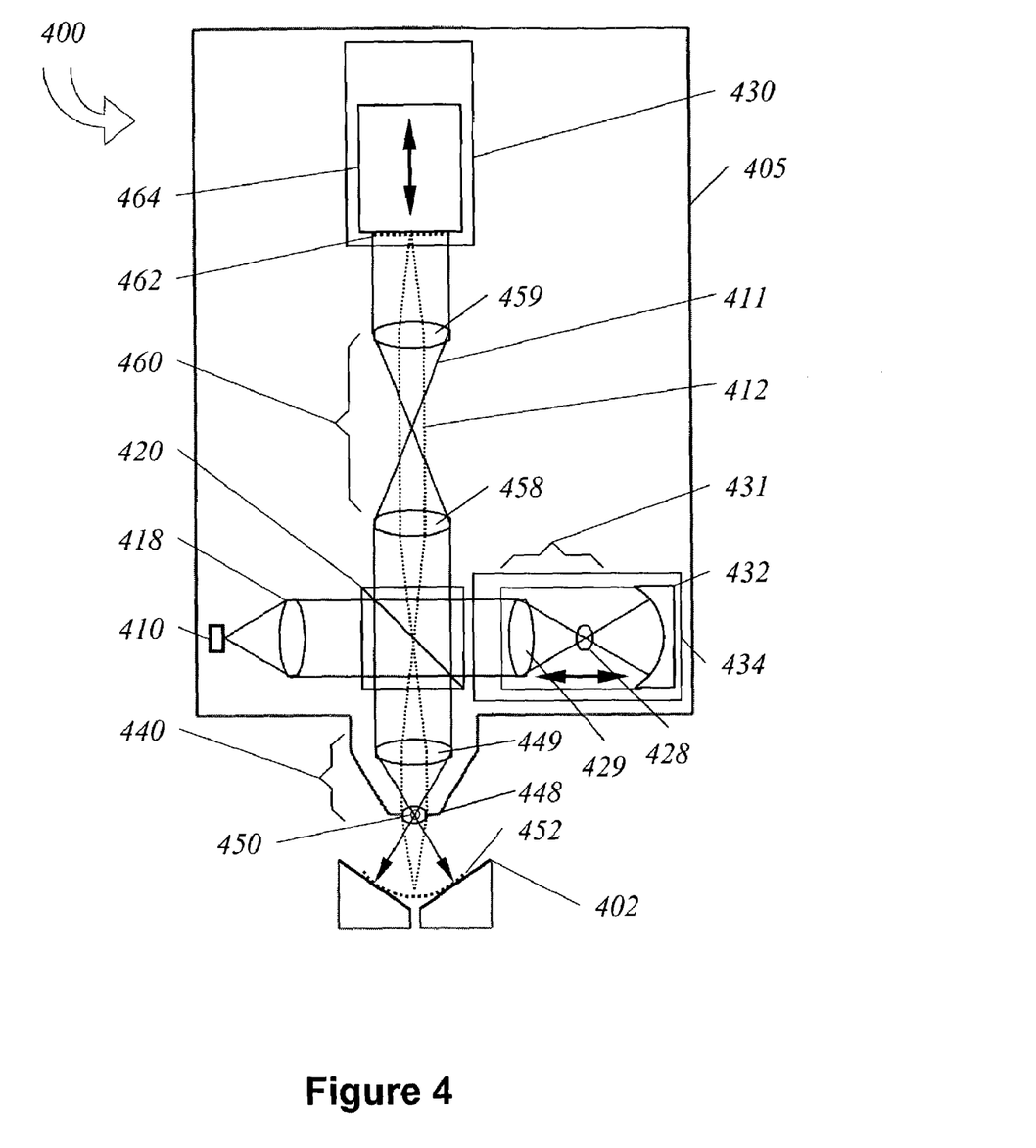
FIG. 4 is a schematic view of another embodiment of an interferometry system.

In some embodiments, an interferometry system can adapted for profiling non-flat surfaces, e.g., spherical and/or conical surfaces. For example, FIG. 4 shows a sensor 400 adapted for profiling a conical test surface 402. Like sensor 100 described above, sensor 400 is similar to a Linnik interferometer in which reference optics 431 essentially duplicate measurement optics 440, for example, to match chromatic dispersion and optical aberrations. Components of sensor 400 are housed in an enclosure 405. Measurement optics 440, including lenses 448 and 449, reference optics 431, including lenses 428 and 429, and a spherical reference mirror 432 are selected and arranged to create a spherical optical measurement surface 452. Lens 429 focuses the reference beam to a point coincident with lens 428. Measurement optics 440 form a virtual image of optical measurement surface 452 within beam splitter 420. Reference optics 440 and reference mirror 432 are mounted on an OPD scan stage 434, which translates the optics and reference mirror to vary the radius of curvature of spherical optical measurement surface 452. Although the radius of curvature can vary, spherical optical measurement surface 452 is centered on a datum point 450 such that a chief ray 411 passes through datum point 450, which in this case is also at the pupil of measurement optics 440. Optical measurement surface 452 represents the instantaneous locus of zero OPD points in space, with all points in focus at a nominal radius of curvature, at least substantially over a limited range of ray angles.

A light source 410 (e.g., a low-coherence source such as a halogen bulb, light emitting diode (LED), super-luminescent diode (SLD)) illuminates both reference optics 431 and measurement optics 440 via an illuminator lens 418 and a beam splitter 420. Imaging optics 460, including lenses 458 and 459, form a flat-field image 462 on a camera 464 of reference mirror 432 and of any eventual object point which may intersect optical measurement surface 452 and reflect or scatter light back through measurement optics 440. This is illustrated by the path of a marginal ray 412. Camera 464 is mounted on a focus scan stage 430 which translates camera 464 towards and away from imaging optics 460.

Adjusting the reference beam path length via an OPD scan stage 434 changes the radius of curvature for measurement surface 452, effectively scanning the area of optical measurement surface 452 with respect to point datum 450, like an inflating balloon, while datum point 450 remains substantially fixed.

Figure 5:
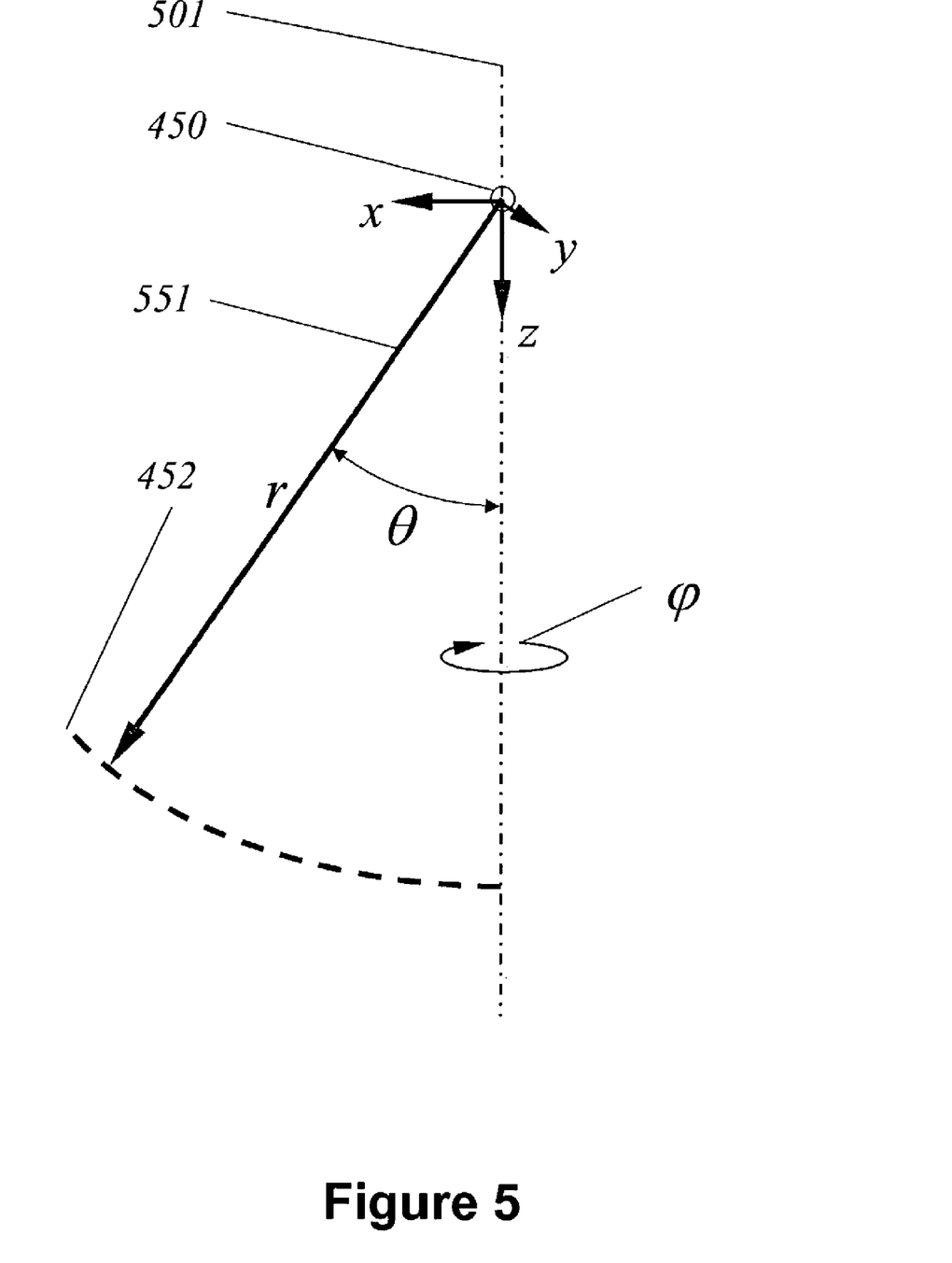
FIG. 5 is a co-ordinate system for the object space of the interferometry system shown in FIG. 4.
Figure 6:
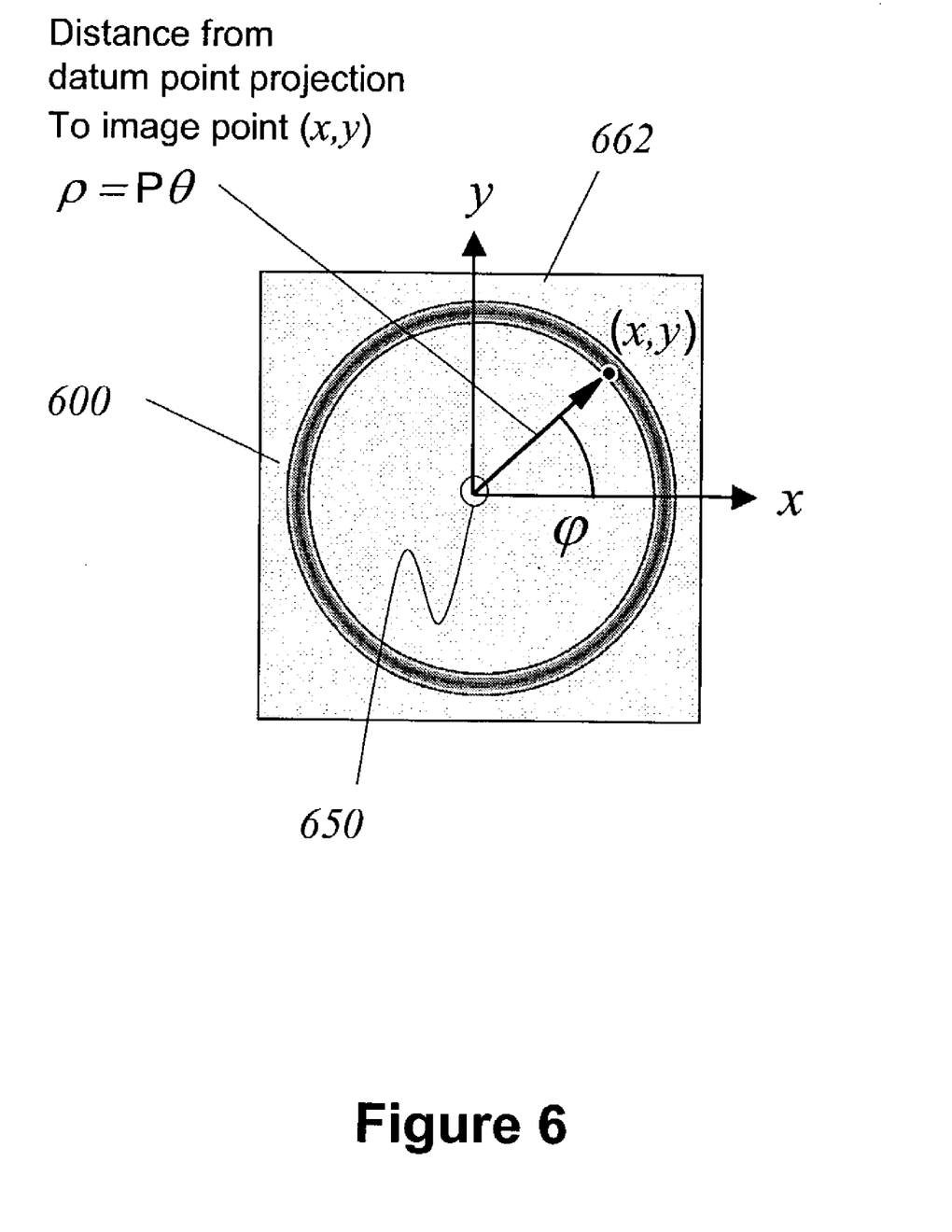
FIG. 6 is a co-ordinate system for image space of the interferometry system shown in FIG. 4.

In this case, the magnification is constantly changing as a function of optical measurement surface position, whereas the field angle at the object is constant throughout the scan. FIG. 5 and FIG. 6 clarify the measurement geometry. FIG. 5 shows a co-ordinate system for the object space of the sensor (i.e., at part surface 402), while FIG. 6 shows a coordinate system for the image space (i.e., at camera. 464). As illustrated in FIG. 5, the radius of curvature, r, of optical measurement surface 452 can be measurement relative to a Cartesian co-ordinate system having its origin at datum point 450. The z-axis is coincident with an optical axis 501 of the imaging system. Chief rays (e.g., chief ray 551) having a field angle θ relative to optical axis 501 as shown in FIG. 5 map to image points at a radius ρ=Pθ, where P is a constant, indicated by image section 600 in FIG. 6, which shows the image area 662 of camera 464. In some embodiments, P can depend on ρ. In general, the relationship between ρ and θ (i.e., P) can be determined using, e.g., ray tracing techniques. The optical axis intersects the camera at point 650. The mapping is symmetric relative to azimuthal angle φ. The magnification constantly changes during the scan because rays at the same field angle, θ, are always imaged to the same radius, ρ, on the camera regardless of radius of curvature, r, of the optical measurement surface. The mapping from object space to image space, as well as methods for analyzing data acquired using such mappings, is described in U.S. patent application Ser. No. 10/190,353, entitled "MEASUREMENT OF COMPLEX SURFACE SHAPES USING A SPHERICAL WAVEFRONT," by Peter de Groot et al., and filed Jul. 3, 2002, the entire contents of which is hereby incorporated by reference.

Figure 7:
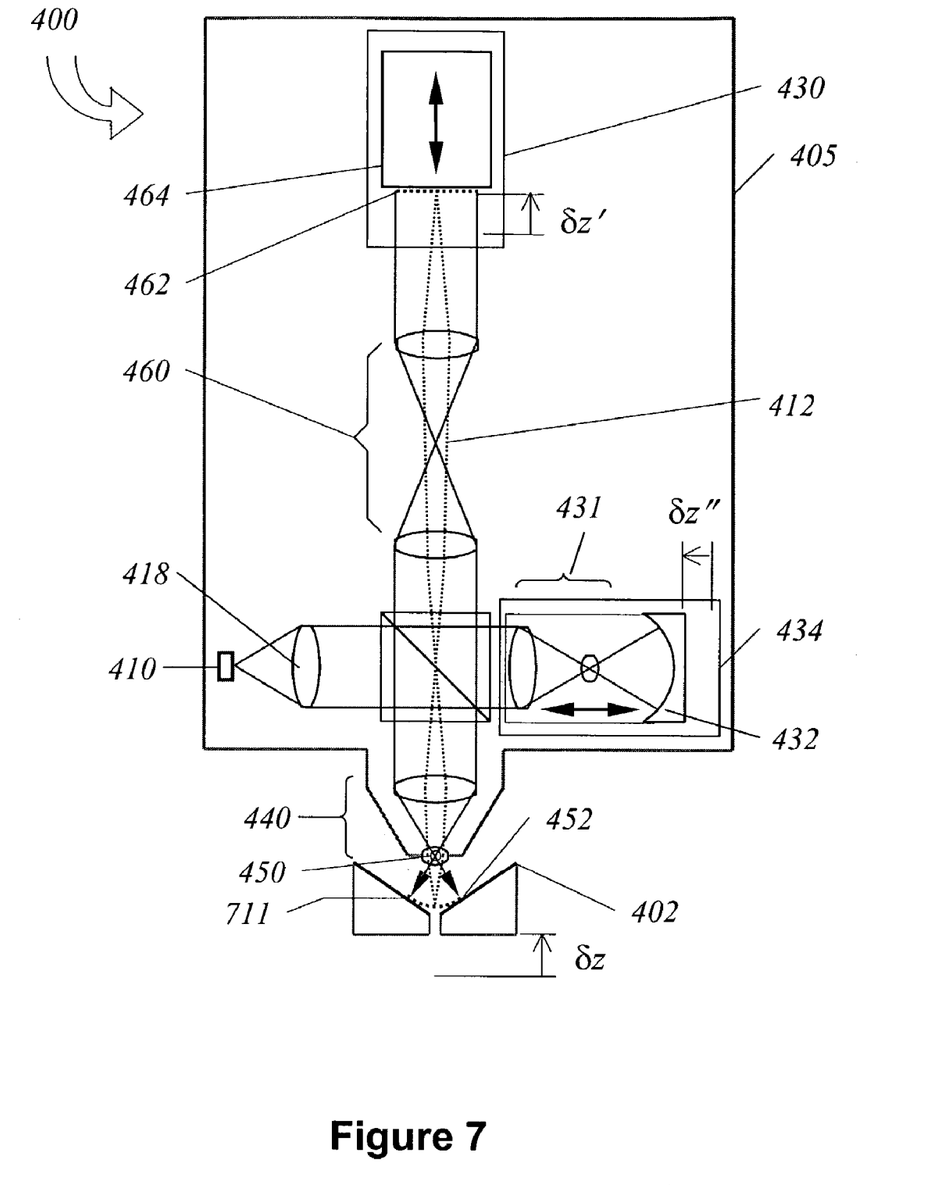
FIG. 7 is a schematic view of the interferometry system of FIG. 4 in a different configuration.

Referring now to FIG. 7, test surface 402 is displaced an amount δz relative to the part's position shown in FIG. 4. In order to profile test surface 402 in this configuration, OPD scan stage 434 translates reference mirror 432 and reference optics 431 by an amount δz", which reduces the radius of curvature of optical measurement surface 452 by δz", bringing it into contact with a portion 711 of test surface 402. The change in radius of optical measurement surface 452 changes the location of image 462 by an amount δz'. To accommodate this change, focus scan stage 430 moves camera 464 so that it remains coincident with image 462 and optical measurement surface 452 remains sharply in focus throughout the OPD scan.

Due to the varying magnification of image 462, the relationship between the OPD scan rate and the focus scan rate in this case can be quite complex, depending on the range of magnification covered during the scan. However, the combined motion of camera 464, reference optics 431, and reference mirror 432 accommodates a wide variety of magnifications and makes it possible to scan the OPD over very long ranges (e.g., relative to the temporal coherence length of source 410) while retaining proper focus. During the scanning, while the magnification changes while the field angle is maintained constant. The rate at which the camera should be scanned relative to the reference optics/mirror to maintain focus can be determined, for example, empirically using a calibration test part or using ray tracing techniques.

Figure 8:
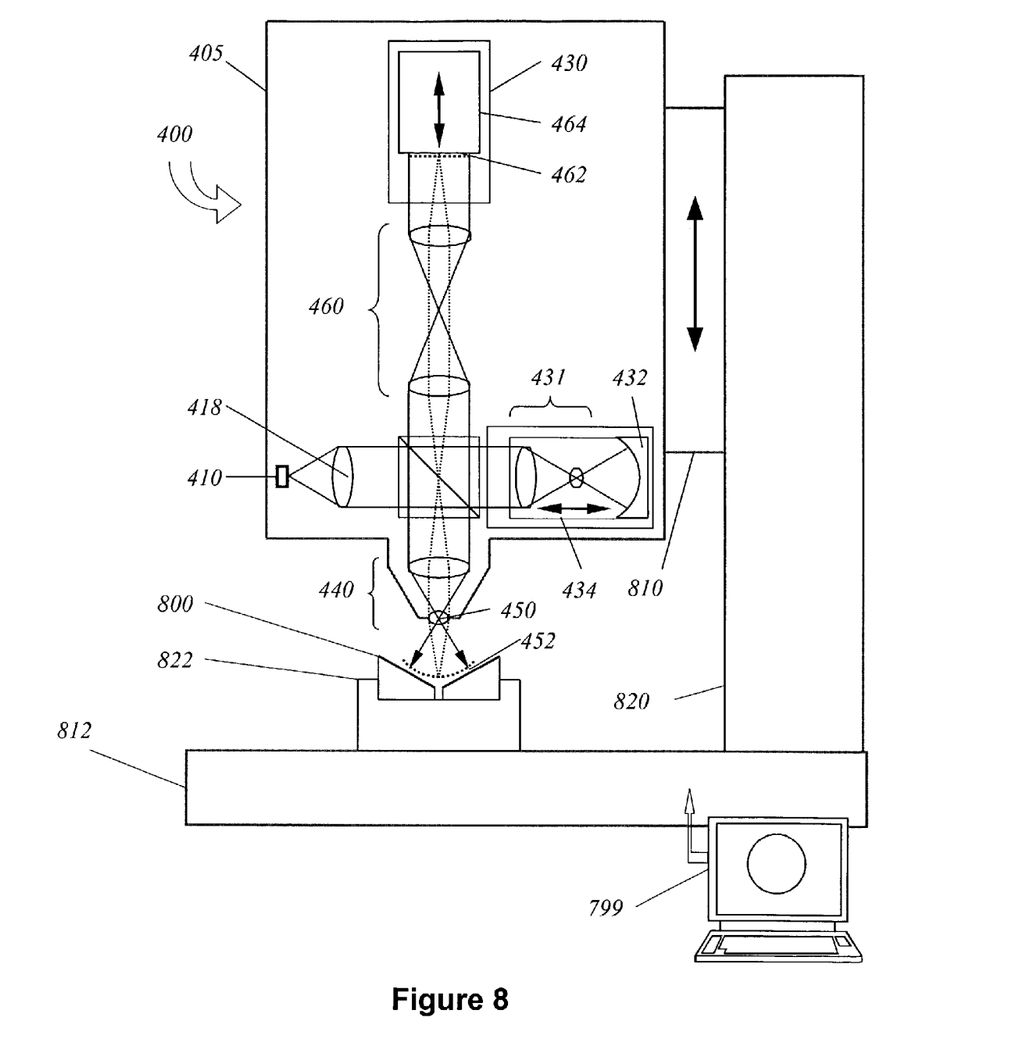
FIG. 8 is a schematic view of a further embodiment of an interferometry system.

Referring to FIG. 8, in some embodiments, sensor 400 is mounted on a z-stage 810 attached to a rigid pillar 820 mounted on a base 812. A test part having a conical test surface 800 is mounted in a part fixture 822 that is attached to base 812. Z-stage 810 provides control of the vertical position of sensor 400 and allows sensor 400 to measure various diameters of test surface 800. Each diameter intersects optical measurement surface 452 for a different radius of curvature, focus setting, and ratio of scan rates for the camera and reference optics. The configuration shown in FIG. 8 facilitates several functional capabilities of the measurement geometry, including, e.g., calculation of the cone angle of conical test surface 800 by measurement of two or more diameters at different z positions and profiling of the entire surface of conical part 800 by combining or stitching together image segments for a sequence of z positions.

Figure 9:
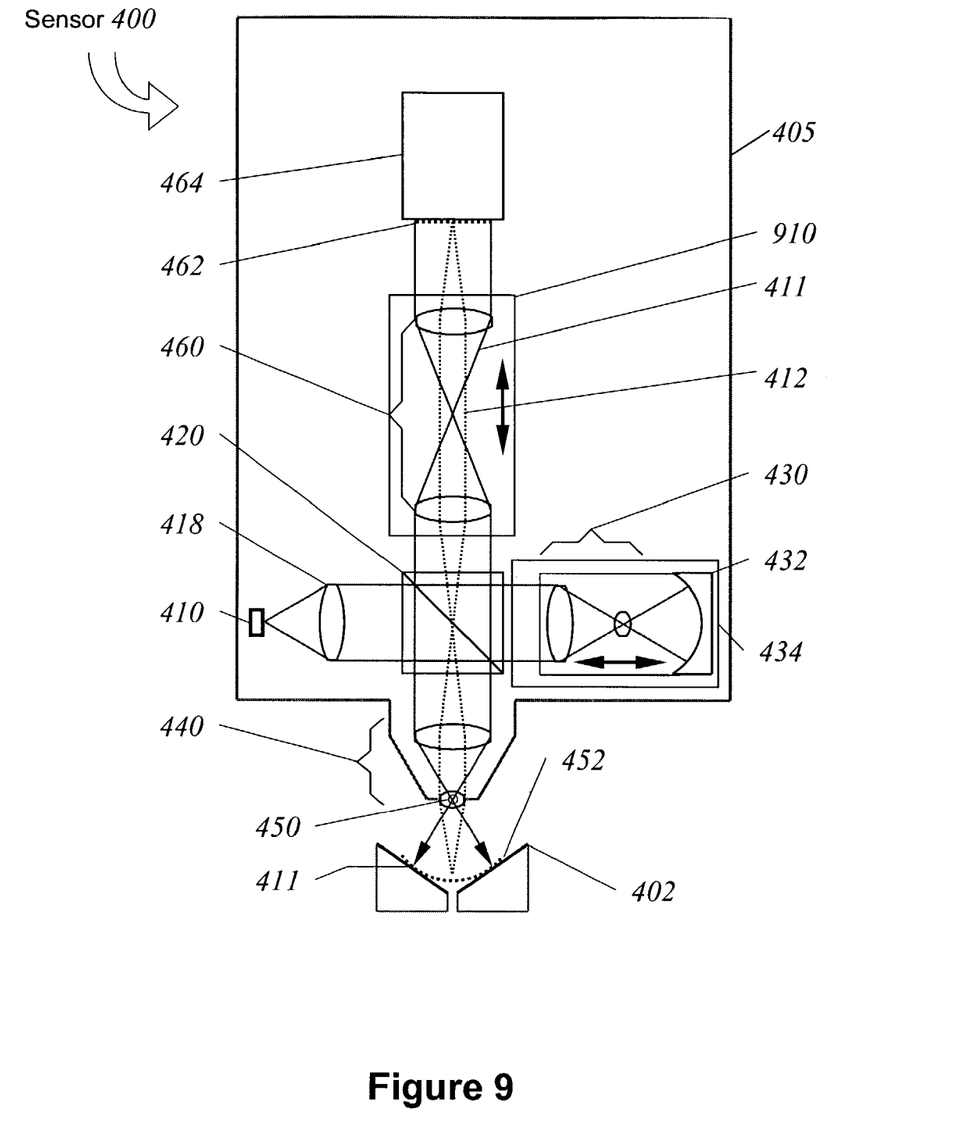
FIG. 9 is a schematic view of the interferometry system of FIG. 4 in a further configuration.

While the foregoing embodiments all scan the location of the camera to maintain focus of the optical measurement surface image, other embodiments are not so limited. In general, other optical components in a sensor can be moved in addition, or alternatively, to the camera to maintain focus. For example, referring to FIG. 9, sensor 400 can be adapted so that imaging optics 460 are moved to maintain focus instead of camera 464. In the embodiment shown in FIG. 9, camera 464 is fixed relative to sensor housing 405, while imaging optics 460 are mounted on a focus scan stage 910. During operation, focus scan stage 910 moves imaging optics 460 to maintain focus of image 462 while OPD scan stage 434 scans the radius of curvature of optical measurement surface 452.

Figure 10A:
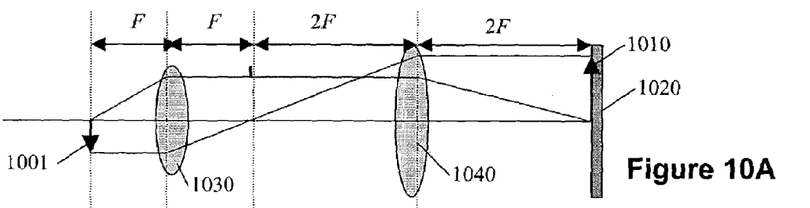
FIGS. 10A–D are schematic diagrams illustrating the relationship between the position of an object and an image in a system having 2× magnification.
Figure 10B:
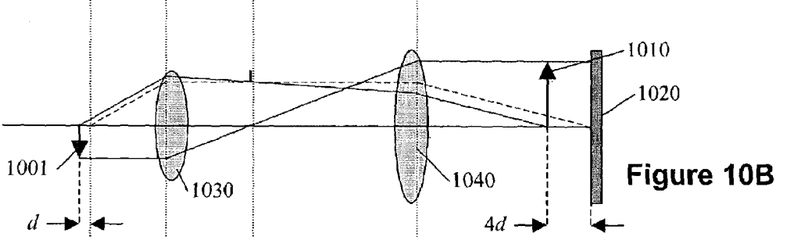
Figure 10C:
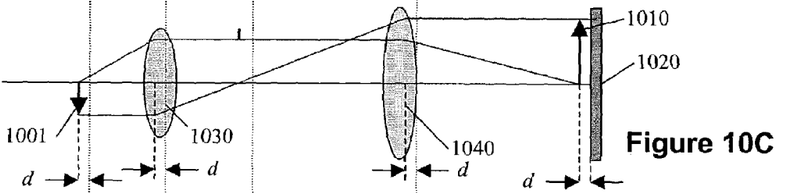
Figure 10D:
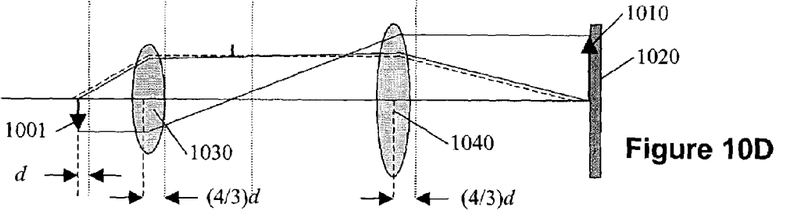

The displacement of the imaging relative to the camera necessary to maintain focus is a function of the magnification of the sensor. Referring to FIG. 10A–FIG. 10D, this relationship is illustrated for a 2× magnification telecentric relay including lenses 1030 and 1040. This relay is equivalent to the imaging system in sensor 100 (see FIG. 1) and to imaging optics 460 in sensor 400 (see FIG. 9), which images the virtual image within beam splitter 420 to camera 464. Referring specifically to FIG. 10A, lens 1030 and lens 1040 having focal lengths F and 2F, respectively, form an image 1010 in an image space of an object 1001 (e.g., a virtual image as for sensor 400). In the present configuration, object 1001 is position on the focal plane of lens 1030, and a detector 1020 is position on the focal plane in object space of lens 1040. Accordingly, image 1010 is coincident with detector 1020. Referring now to FIG. 10B, object 1001 is displaced an amount d away from the focal plane of lens 1030. Accordingly, image 1010 is displaced by an amount proportional to the square of the system's magnification in the same direction as object 1001. The present system has 2× magnification, so object 1010 is displaced 4d. Note that this is equivalent to the configuration shown in FIG. 3, in which the detector is displaced by 4δz to maintain the optical measurement surface in focus. Referring to FIG. 10C, displacing lenses 1030 and 1040 by d moves image 1010 closer to detector 1020, but as this is simply a translation of the entire configuration shown in FIG. 10A (except detector 1020) by an amount d, the object is also displaced by an amount d from the detector's position. Accordingly, the lenses should be displaced by more than d to account for the non one-to-one scaling caused by the system's magnification. Referring to FIG. 10D, displacement of lenses 1030 and 1040 by an amount (4/3)d now brings image 1010 back into focus on detector 1020. More generally, for telecentric a focal optical systems with magnification not equal to one, the optics should be displaced an amount $D=M^2/(M^2-1)d$, to accommodate a displacement d of the optical measurement surface. Here, M refers to the system's magnification. Because the optics are telecentric, the magnification is constant regardless of object and image positions. Equivalently, in the case of constant angular mapping the height at the camera corresponding to a given field angle is independent of object and image locations.

Although the embodiments described above are with respect to low coherence interferometry, other interferometry techniques can also be used. For example, interferometry methods using a long temporal coherence length light source (e.g., lasers) can also be used. One such technique is phase shifting interferometry (PSI). In PSI, the phase of a detected interference signal is varied by, e.g., varying the wavelength of the light source or dithering the position of a reference surface. The difference in phase of the interference signal as a function of wavelength or reference surface position relates directly to the total optical path difference in the interferometer. In PSI, interference images are acquired according to a phase-shifting algorithm so that each incremental change in interference signal can be related to a known wavelength change of, or OPD change between, reference and measurement wavefronts. Examples of PSI techniques can be found in U.S. Pat. No. 6,359,692, entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY," to Peter de Groot, U.S. patent application Ser. No. 10/144,527, entitled "APPARATUS AND METHOD FOR PHASE-SHIFTING INTERFEROMETRY," to Michael Kuchel et al., and U.S. Provisional Application Serial No. 60/339,214, entitled "FREQUENCY TRANSFORM PHASE-SHIFTING INTERFEROMETRY," to Leslie L. Deck. Note that when using a long temporal coherence length light source, the optical measurement surface can correspond to a constant but nonzero OPD.

Long wavelength (e.g., infrared, such as 0.75–10 μm) interferometry techniques can also utilize the aforementioned methods and systems. Surfaces that diffusely reflect visible wavelengths or light can appear specular to longer wavelengths. Hence, long wavelength sources can be used to characterize rough surfaces. Of course, for long wavelength interferometry, the system detector and optical components should be selected to perform appropriately at the light source wavelength. Long wavelength interferometry techniques are further described in U.S. Pat. No. 6,195,168, entitled "INFRARED SCANNING INTERFEROMETRY APPARATUS AND METHOD," to Xavier Colonna de Lega et al.

Furthermore, although the aforementioned embodiments include Linnik-type interferometers, other types of interferometer can be adapted for the same purpose. Examples of other interferometers include Mirau interferometers and Mach-Zehnder interferometers.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   imaging test light reflected from a test surface to interfere with reference light on a camera and form an interference pattern, the test light and reference light being derived from a common source,
   wherein optical paths for the test and reference light define an optical measurement surface corresponding to a theoretical test surface that would reflect the test light to produce a constant optical path length difference between it and the reference light over the camera;
   scanning the optical measurement surface relative to the test surface, wherein the scanning comprises scanning a radius of curvature of a locally spherical portion of the optical measurement surface; and
   adjusting a position of the camera relative to an image of the optical measurement surface nearest the camera during the scan of the optical measurement surface.

2. The method of claim 1, wherein the constant optical path length difference is a zero optical path length difference.

3. The method of claim 1, wherein the position of the camera relative to the image of the optical measurement surface is adjusted during the scan of the optical measurement surface to maintain the optical measurement surface within a depth of focus of an imaging system used to image the test light to the camera.

4. The method of claim 1, wherein adjusting the position of the camera relative to the image of the optical measurement surface comprises moving the camera.

5. The method of claim 1, wherein adjusting the position of the camera relative to the image of the optical measurement surface comprises moving at least one component used to image the test light to the camera.

6. The method of claim 5, wherein adjusting the position of the camera relative to the image of the optical measurement surface comprises moving a telescopic relay used to image the test light to the camera, wherein the telescopic relay has a magnification unequal to 1.

7. The method of claim 1, further comprising recording images of the interference pattern with the camera as a function of the optical measurement surface scan.

8. The method of claim 1, wherein the radius of curvature varied relative to a measurement datum point.

9. The method of claim 1, wherein the imaging comprises focusing the test light towards a measurement datum point.

10. The method of claim 9, wherein the measurement datum point is positioned prior to the test surface.

11. The method of claim 1, wherein the reference light reflects from a reference surface prior to reaching the camera, and wherein scanning the optical measurement surface relative to the test surface comprises moving at least the reference surface.

12. The method of claim 11, wherein the reference light is focused towards a reference focal point prior to reflecting from the reference surface.

13. The method of claim 12, wherein the reference focal point is positioned prior to the reference surface.

14. The method of claim 12, wherein the reference light reflects from a curved portion of the reference surface.

15. The method of claim 14, wherein the reference surface reflects the reference light back to the reference focal point.

16. The method of claim 12, wherein scanning the optical measurement surface relative to the test surface comprises scanning a location of the reference focal point.

17. The method of claim 11, wherein the reference light reflects from a planar portion of the reference surface.

18. The method of claim 1, wherein the common source has a coherence length and wherein the optical measurement surface is scanned over a range larger than the coherence length.

19. The method of claim 1, wherein the common source has a coherence length and wherein the optical measurement surface is scanned over a range smaller than the coherence length.

20. The method of claim 1, wherein the test light and the reference light are derived from the common source using an interferometer.

21. The method of claim 20, wherein the interferometer is a Linnik interferometer.

22. The method of claim 20, wherein the interferometer is a Mirau interferometer.

23. The method of claim 20, further comprising adjusting the location of the test surface relative to the interferometer.

24. Apparatus comprising:
an interferometric imaging system configured to image test light reflected from a test surface to interfere with reference light on a camera and form an interference pattern, the test light and reference light being derived from a common source,
wherein optical paths for the test and reference light define an optical measurement surface corresponding to a theoretical test surface that would reflect the test light to produce a constant optical path length difference between it and the reference light over the camera;
wherein the interferometric imaging system comprises a first stage configured to scan the optical measurement surface relative to the test surface by scanning a radius of curvature of a locally spherical portion of the optical measurement surface, and a second stage configured to adjust a position of the camera relative to an image of the optical measurement surface nearest the camera during the scan of the optical measurement surface.

25. The apparatus of claim 24, wherein the constant optical path length difference is a zero optical path length difference.

26. The apparatus of claim 24, further comprising an electronic controller in communication with the first stage and second stage, wherein during operation the electronic controller causes the first stage to scan the optical measurement surface relative to the test surface and causes the second stage to adjust the position of the camera relative to the image of the optical measurement surface nearest the camera to maintain the optical measurement surface within a depth of focus of the interferometric imaging system.

27. The apparatus of claim 26, wherein the camera is mounted on the second stage and during operation the electronic controller causes the second stage to adjust the position of the camera relative to the test surface to maintain the optical measurement surface within a depth of focus of the interferometric imaging system.

28. The apparatus of claim 26, wherein the interferometric imaging system further comprises at least one imaging component mounted on the second stage and during operation the electronic controller causes the second stage to adjust the position of the imaging component relative to the test surface to maintain the optical measurement surface within a depth of focus of the interferometric imaging system.

29. The apparatus of claim 28, wherein the at least one imaging component is a telescopic relay mounted on the second stage and during operation the electronic controller causes the second stage to adjust the position of the telescopic relay relative to the test surface to maintain the optical measurement surface within a depth of focus of the interferometric imaging system.

30. The apparatus of claim 29, wherein the telescopic relay has a magnification unequal to 1.

31. The apparatus of claim 26, wherein the electronic controller is also in communication with the camera and during operation the electronic controller records images of the interference pattern with the camera as a function of the optical measurement surface scan.

32. The apparatus of claim 24, wherein the interferometric imaging system comprises measurement optics, which direct test light to and from the test surface, and reference optics, which direct reference light to and from a reference surface.

33. The apparatus of claim 32, wherein the reference optics are identical to the test optics.

34. The apparatus of claim 32, wherein the reference surface is mounted on the first stage and during operation the first stage scans the optical measurement surface relative to the test surface by translating the reference surface.

35. The apparatus of claim 34, wherein the reference optics are also mounted on the first stage and during operation the first stage scans the optical measurement surface relative to the test surface by translating the reference optics and the reference surface.

36. The apparatus of claim 34, wherein the reference surface is a planar surface.

37. The apparatus of claim 34, wherein the reference surface is a curved surface.

38. The apparatus of claim 37, wherein the reference surface is a spherical surface.

39. The apparatus of claim 32, wherein the reference optics comprise a reference lens that focuses the reference light towards a reference focal point.

40. The apparatus of claim 32, wherein the measurement optics comprise an objective lens, which focuses the measurement light toward a measurement datum point.

41. The apparatus of claim 24, wherein the optical measurement surface comprises a planar surface.

42. The apparatus of claim 24, wherein the optical measurement surface comprises a locally spherical surface.

43. The apparatus of claim 24, wherein the source is a broadband source.

44. The apparatus of claim 24, wherein the interferometric imaging system comprises a Linnik interferometer which derives the test light and reference light from the common source.

45. The apparatus of claim 24, wherein the interferometric imaging system comprises a Mirau interferometer which derives the test light and reference light from the common source.

46. The apparatus of claim 24, further comprises a third stage configured to adjust a position of the test surface relative to the interferometric imaging system.

47. The method of claim 1, wherein the test surface is stationary relative to the light source while the optical measurement surface is scanned.

48. An apparatus comprising:
an interferometric imaging system configured to image test light reflected from a test surface to interfere with reference light reflected from a reference surface on a camera and form an interference pattern, the test light and reference light being derived from a common source, the interferometric imaging system comprising:
measurement optics configured to shape the test light so that the test light diverges at the test surface;
a first stage configured to translate the reference surface relative to the measurement optics to vary an optical path difference between the test light and reference light at the camera, and
a second stage configured to adjust a position of the camera relative to the measurement optics simultaneously with the motion of the first stage.

49. A method comprising:
imaging test light reflected from a test surface to interfere with reference light on a camera and form an interference pattern, the test light and reference light being derived from a common source,
wherein optical paths for the test and reference light define an optical measurement surface corresponding to a theoretical test surface that would reflect the test light to produce a constant optical path length difference between it and the reference light over the camera;
scanning the optical measurement surface relative to the test surface, wherein the test surface is stationary relative to the light source during the scan of the optical measurement surface; and
adjusting a position of the camera relative to an image of the optical measurement surface nearest the camera during the scan of the optical measurement surface.

* * * * *